(12) United States Patent
Liang et al.

(10) Patent No.: US 11,674,620 B2
(45) Date of Patent: Jun. 13, 2023

(54) VIBRATION ABSORPTION TUBING AND MANUFACTURING METHOD THEREOF

(71) Applicant: XINCHANG COUNTY SITONG ELECTRICAL CO., LTD., Zhejiang (CN)

(72) Inventors: Dongsen Liang, Zhejiang (CN); Qi Wang, Zhejiang (CN); Guoliang Wang, Zhejiang (CN); Xiaode Wang, Zhejiang (CN); Hongbin Zhang, Zhejiang (CN)

(73) Assignee: XINCHANG COUNTY SITONG ELECTRICAL CO., LTD, Zhejiang (CN)

( * ) Notice: Subject to any disclaimer, the term of this patent is extended or adjusted under 35 U.S.C. 154(b) by 713 days.

(21) Appl. No.: 16/491,084

(22) PCT Filed: Mar. 6, 2018

(86) PCT No.: PCT/CN2018/078095
§ 371 (c)(1),
(2) Date: Sep. 4, 2019

(87) PCT Pub. No.: WO2018/161882
PCT Pub. Date: Sep. 13, 2018

(65) Prior Publication Data
US 2020/0041217 A1    Feb. 6, 2020

(30) Foreign Application Priority Data

Mar. 6, 2017  (CN) .......................... 201710129655.2
Mar. 6, 2017  (CN) .......................... 201710129671.1
(Continued)

(51) Int. Cl.
*F16L 9/02*   (2006.01)
*F16L 11/15*  (2006.01)
(Continued)

(52) U.S. Cl.
CPC ........... *F16L 11/15* (2013.01); *F16L 25/0036* (2013.01); *F25B 41/40* (2021.01); *F28F 1/08* (2013.01);
(Continued)

(58) Field of Classification Search
CPC .......... F16L 11/11; F16L 11/15; F16L 11/115; F16L 9/02; F16L 9/06; F16L 13/02;
(Continued)

(56) References Cited

U.S. PATENT DOCUMENTS 4,061,368 A * 12/1977 Auriemma .......... F16L 25/0036
                                                   285/903
4,275,937 A *  6/1981 Belofsky
(Continued)

FOREIGN PATENT DOCUMENTS

CN         2806941 Y      8/2006
CN       101086437 A     12/2007
(Continued)

OTHER PUBLICATIONS

Stainless Steel. [online]. Wikipedia. Retrieved from the Internet: <URL:https://en.wikipedia.org/wiki/Stainless_steel> (Year: 2022).*
(Continued)

*Primary Examiner* — Zachary T Dragicevich
*Assistant Examiner* — William S. Choi
(74) *Attorney, Agent, or Firm* — Ohlandt, Greeley, Ruggiero and Perle, LLP

(57) ABSTRACT

Vibration absorption tubing and a manufacturing method thereof. The manufacturing method includes: a solder placement step including: placing solder at solder placement portions in an inner cavity of an adaptor; a pipe fitting step including: fitting a corrugated pipe and the adaptor respectively to adaptor matching portions at corresponding sides of the adaptor, to communicate an adaptor inner cavity with an
(Continued)

inner cavity of the corrugated pipe and inner cavities of external connection tubing; and fixing or limiting positions of the corrugated pipe, the adaptor, and the external connection tubing to obtain a tubing assembly; and a component brazing step including: performing furnace brazing on the tubing assembly of the external connection tubing to obtain a main vibration absorption tubing. The vibration absorption tubing has favorable brazing consistency, enhancing connection reliability of components.

8 Claims, 6 Drawing Sheets

(30) Foreign Application Priority Data

| | | | |
|---|---|---|---|
| Mar. 6, 2017 | (CN) | ........................ | 201710129949.5 |
| Mar. 6, 2017 | (CN) | ........................ | 201710130197.4 |
| Mar. 6, 2017 | (CN) | ........................ | 201710130376.8 |
| Mar. 6, 2017 | (CN) | ........................ | 201720211945.7 |
| Mar. 6, 2017 | (CN) | ........................ | 201720212281.6 |
| Mar. 6, 2017 | (CN) | ........................ | 201720212911.X |
| Mar. 6, 2017 | (CN) | ........................ | 201720213393.3 |

(51) Int. Cl.
*F16L 13/08* (2006.01)
*F16L 25/00* (2006.01)
*F16L 55/033* (2006.01)
*B23K 1/008* (2006.01)
*F28F 1/08* (2006.01)
*F25B 41/40* (2021.01)
*F16L 13/02* (2006.01)

(52) U.S. Cl.
CPC ................ *B23K 1/008* (2013.01); *F16L 9/02* (2013.01); *F16L 13/0227* (2013.01); *F16L 13/08* (2013.01); *F16L 55/033* (2013.01); *F28F 2265/26* (2013.01)

(58) Field of Classification Search
CPC ... F16L 13/08; F16L 25/0036; F16L 25/0063; F16L 27/11; F16L 27/111; F16L 51/02; F28F 1/08
USPC .......... 285/226, 227, 299, 145.5, 289.1, 903
See application file for complete search history.

(56) References Cited

U.S. PATENT DOCUMENTS

| | | | | |
|---|---|---|---|---|
| 5,058,934 | A | * 10/1991 | Brannon | ................ F16L 27/111 |
| | | | | 285/226 |
| 2002/0195817 | A1 | * 12/2002 | Choi | ...................... F16L 11/115 |
| | | | | 285/226 |
| 2010/0192623 | A1 | 8/2010 | Cittadini | |
| 2014/0311610 | A1 | 10/2014 | Kwon | |

FOREIGN PATENT DOCUMENTS

| | | |
|---|---|---|
| CN | 1012799394 A | 10/2008 |
| CN | 201198932 Y | 2/2009 |
| CN | 201502831 U | 6/2010 |
| CN | 101821563 A | 9/2010 |
| CN | 201772185 U | 3/2011 |
| CN | 202501121 U | 10/2012 |
| CN | 202972254 U | 6/2013 |
| CN | 203083220 U | 7/2013 |
| CN | 2032151 U | 9/2013 |
| CN | 103551692 A | 2/2014 |
| CN | 103791196 A | 5/2014 |
| CN | 206145298 U | 5/2017 |
| CN | 206816984 U | 12/2017 |
| CN | 206816985 U | 12/2017 |
| DE | 2822999 A1 | 1/1979 |
| GB | 1585045 A | 2/1981 |
| JP | S5047854 A | 4/1975 |
| JP | S5494619 U | 7/1979 |
| JP | S59131781 A | 7/1984 |
| JP | S60155084 A | 8/1985 |
| JP | H02120594 A | 5/1990 |
| JP | H073861 U | 1/1995 |
| JP | 2000249264 A | 9/2000 |
| JP | 5523587 B2 | 6/2014 |
| WO | 2011096678 A2 | 8/2011 |

OTHER PUBLICATIONS

Copper. [online]. Wikipedia. Retrieved from the Internet: <URL:https://en.wikipedia.org/wiki/Copper> (Year: 2022).*
Japanese Office Action dated Aug. 31, 2020 for Japanese application No. 2019-549405.
International Search Report dated May 23, 2018 for PCT application No. PCT/CN2018/078095.
Japanese Office Action dated Apr. 27, 2021 for Japanese Appl. No. 2019-549405.
Chinese Office Action dated Feb. 3, 2020 for Chinese Appl. No. 201710130376.8.

* cited by examiner

VIBRATION ABSORPTION TUBING AND MANUFACTURING METHOD THEREOF

This application is the national phase of International Application No. PCT/CN2018/078095, titled "VIBRATION ABSORPTION TUBING AND MANUFACTURING METHOD THEREOF", filed on Mar. 6, 2018, which claims the benefit of priorities to the following nine Chinese Patent Applications: No. 201710129655.2, No. 201710129671.1, No. 201710129949.5, No. 201710130197.4, No. 201720211945.7, No. 201720212281.6, No. 201720212911.X and No. 201720213393.3, titled "VIBRATION ABSORBING PIPE", and No. 201710130376.8, titled "VIBRATION ABSORBING PIPE AND MANUFACTURING METHOD THEREOF", filed with the Chinese State Intellectual Property Office on Mar. 6, 2017, the entire disclosures of which are incorporated herein by reference.

FIELD

Embodiments of the present application relate to refrigeration systems, and in particular to a vibration absorbing pipe used in a refrigeration system such as an air conditioner or a refrigerator, and a manufacturing method thereof.

BACKGROUND

In situations that air conditioners, refrigerators or the like are applied, vibration absorbing pipes (or called vibration avoiding pipes, vibration preventing pipes, etc.) can be used to connect circulation lines between a compressor and a refrigeration system, or be used in other situations that require vibration absorption, to absorb vibration and noises generated by the compressor. A vibration absorbing pipe includes a stainless steel corrugated pipe. In order to protect the corrugated pipe, an adapting pipe made of stainless steel or copper adaptor may generally be welded to the corrugated pipe, so as to be welded to a pipe component of an external system. The weld seam is located at the outer side of the vibration absorbing pipe, and the weld seam is exposed to the air during use, which may cause corrosion, so there is room for improvement.

SUMMARY

In view of the disadvantages in the conventional technology, an object of the embodiments of the present application is to provide a vibration absorbing pipe and a manufacturing method thereof for improving connection reliability of the vibration absorbing pipe.

A technical solution is provided according to the present application. A vibration absorbing pipe, including a corrugated pipe, wherein the corrugated pipe includes a corrugated pipe body and a corrugated pipe connecting section, and at least one end of the corrugated pipe body is provided with the corrugated pipe connecting section. The vibration absorbing pipe further includes an adaptor, the adaptor includes an adaptor fitting portion that fits with the corrugated pipe connecting section, and the corrugated pipe is welded to the adaptor through the corrugated pipe connecting section. The adaptor has an inner cavity, and the inner cavity of the adaptor is in communication with an inner cavity of the corrugated pipe. The corrugated pipe connecting section is at least partially located in the adaptor, the corrugated pipe connecting section is used for fitting with the adaptor, an outer wall portion of the corrugated pipe connecting section is fixed to at least a portion of an inner wall portion of the adaptor fitting portion by welding, and a weld seam between the corrugated pipe and the adaptor is at least partially located at the corrugated pipe connecting section and/or an inner side of the adaptor.

A technical solution is further provided according to the present application. A method for manufacturing a vibration absorbing pipe, wherein the vibration absorbing pipe includes a corrugated pipe, an adaptor and a connecting pipe, the corrugated pipe includes a corrugated pipe body located at a middle portion, at least one end of the corrugated pipe body is provided with a corrugated pipe connecting section extending axially. The adaptor has an inner cavity, a middle portion of the inner cavity of the adaptor is provided with a solder portion, two ends of the inner cavity of the adaptor are each provided with an adaptor fitting portion, and the manufacturing procedure of the vibration absorbing pipe includes the following processes:

a solder placement process: placing a solder in the solder portion of the inner cavity of the adaptor;

a pipe assembling process: assembling the corrugated pipe, the adaptor and the connecting pipe together, making the corrugated pipe and the adaptor fitting portion, located at a side corresponding to the corrugated pipe, be fixed or limited with respect to each other through fitting, making the connecting pipe and a connecting pipe fitting portion, located at a side corresponding to the connecting pipe, be fixed or limited with respect to each other through fitting, such that the inner cavity of the adaptor is in communication with an inner cavity of the corrugated pipe and an inner cavity of the connecting pipe, and a pipe assembly is formed;

an assembly welding process: performing furnace welding on the pipe assembly including the corrugated pipe, the adaptor and the connecting pipe, to obtain a vibration absorbing pipe body.

According to the above technical solutions, the corrugated pipe connecting section of the vibration absorbing pipe configured for fitting with the adaptor is at least partially located in the adaptor, and the weld seam between the corrugated pipe and the adaptor is located at the corrugated pipe connecting section and/or the inner cavity of the adaptor. When the vibration absorbing pipe is used, generally a fluid medium such as a refrigerant of a refrigeration system circulates inside the vibration absorbing pipe. With the above arrangement, even if the weld seam is exposed, for example, the weld seam is in contact with the fluid medium, the weld seam is less likely to be corroded, the corrosion is relatively reduced, and thereby the connection reliability between the vibration absorbing pipe and related components are improved. According to another technical solution of the present application, the corrugated pipe, the connecting pipe and the adaptor are machined into an assembly, and the assembly is integrally welded in a furnace, thus the welding process is relatively simplified, and the connection reliability between the components of the vibration absorbing pipe is improved by improving the welding consistency between the components.

DETAILED DESCRIPTION OF EMBODIMENTS

Figure 1:
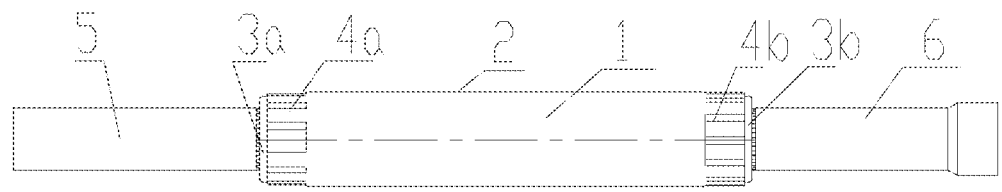
FIG. 1 is a schematic view showing a vibration absorbing pipe according to a specific embodiment of a technical solution of the present application.

For those skilled in the art to better understand technical solutions of the present application, the present application is described in detail in conjunction with drawings and embodiments hereinafter.

For convenience, numerical ranges involved in the description of the specification of the present application are defined as follows: on one hand, a number range includes a threshold thereof, for example, above 2.5 means greater than or equal to 2.5, within 10 means equal to or less than 10, and exceeding −8 means greater than or equal to −8, etc.; on the other hand, an approximate number is taken as a number range of ±10% of a central value, for example, approximately 15 means 15±10%, substantially 3 refers to a number range of 3±10%, equivalent to 6 refers to a number range of 6±10%, substantially 120 refers to a number range of 120±10%, close to 6.2 refers to a number range of 6.2±10%, and so on.

Referring to FIGS. 1 to 16, which respectively show a vibration absorbing pipe according to a specific embodiment of a technical solution of the present application, and the structures of a corrugated pipe, adaptors, connecting pipes and blanks of pressing rings of the vibration absorbing pipe. In the figures, an axial direction refers to a direction of an axis of a pipe component, a circumferential direction refers to a circumference vertical to the axis of the pipe component, and a radial direction refers to a direction of a radius of the circumference vertical to the axis of the pipe component; an outer side refers to a side away from the corrugated pipe and an inner side refers to a side close to the corrugated pipe. Hereinafter, unless otherwise specified, the terms are defined as above.

Referring to FIGS. 1 to 4, the vibration absorbing pipe according to the embodiment of the present application includes a corrugated pipe 1, a first adaptor 3a, a second adaptor 3b, a first connecting pipe 5, a second connecting pipe 6, a braided mesh hose 2, a first pressing ring 4a, a second pressing ring 4b and the like. Since the first adaptor 3a and the second adaptor 3b of the embodiment have same structures or similar structures including same portions, for convenience of illustration, in some drawings, the first adaptor 3a or the second adaptor 3b is represented by an adaptor 3, without distinguishing between reference numerals. Similarly, since the first pressing ring 4a and the second pressing ring 4b have same structures or similar structures including same portions, for convenience of illustration, in some drawings, the first pressing ring 4a or the second pressing ring 4b is represented by a pressing ring 4 without distinguishing between reference numerals. Besides, in other embodiments, structures such as the adaptor 3a, 3b or the pressing ring 4 may be only provided at one side of the vibration absorbing pipe, especially an end connected to a vibration source or an end relatively close to the vibration source. The basic structure and function of the components of the vibration absorbing pipe are described as follows.

Figure 5:
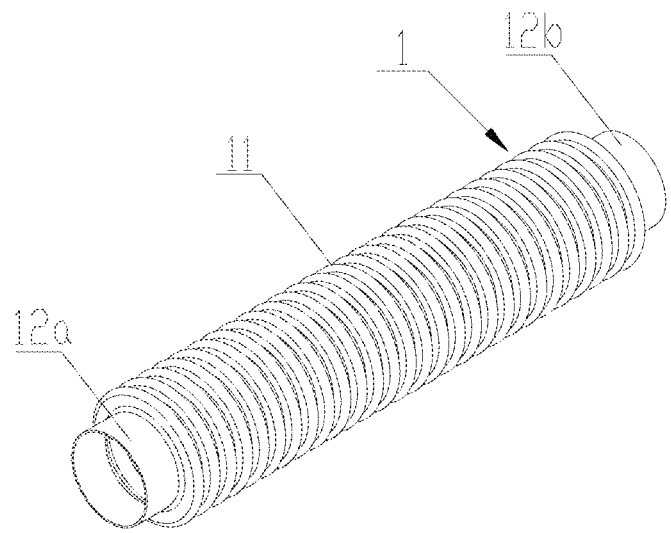
FIG. 5 is a schematic view showing a corrugated pipe in FIG. 1.
Figure 6:
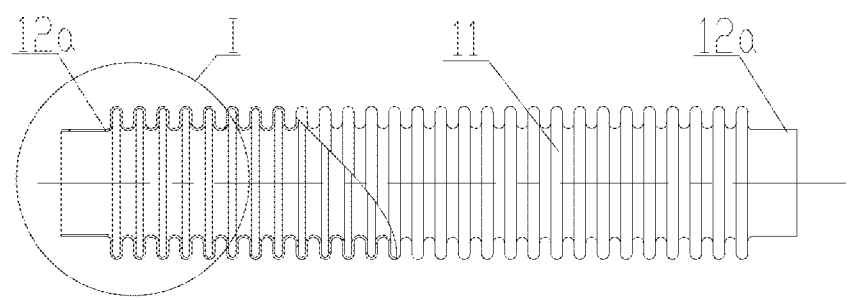
FIG. 6 is a schematic axial sectional view of the corrugated pipe in FIG. 5.
Figure 7:
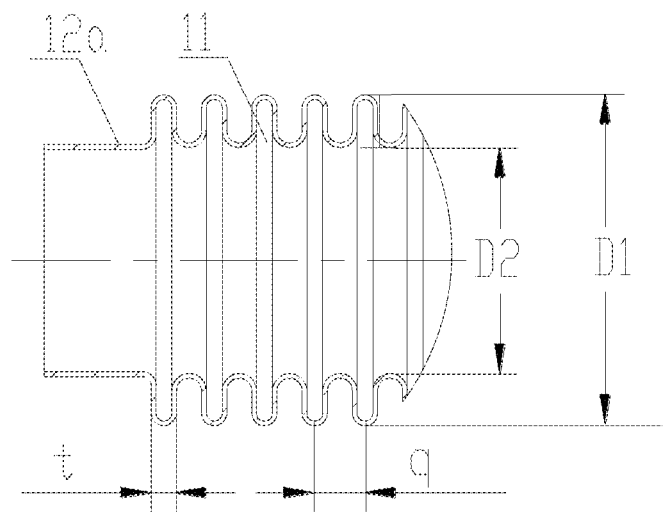
FIG. 7 is an enlarged schematic view of a portion I in FIG. 6.

The structure of the corrugated pipe 1 is shown in FIGS. 5 to 7. The corrugated pipe includes a corrugated pipe body section 11 in a middle portion. Two ends of the corrugated pipe body section 11 extend axially to form a first corrugated pipe connecting section 12a and a second corrugated pipe connecting section 12b. The first corrugated pipe connecting section and the second corrugated pipe connecting section may sometimes also be defined as a first corrugated pipe extending section and a second corrugated pipe extending section. The first and second corrugated pipe connecting sections are structures including tubular structures, and lengths of the first and second corrugated pipe connecting sections generally range from 5 mm to 10 mm. In addition, in a case that the corrugated pipe is relatively large, the first and second corrugated pipe connecting sections may be lengthened appropriately, while in a case that the structure is relatively compact, the length of the second corrugated pipe connecting section 12b may range from 3 mm to 6 mm. It should be noted that, since the first corrugated pipe connecting section 12a and the second corrugated pipe connecting section 12b in the present embodiment have same structures or similar structures including same portions, the first and second corrugated pipe connecting sections are sometimes uniformly represented by a corrugated pipe connecting section 12 without distinguishing between 12a and 12b. Besides, two sides of each of the corrugated pipe connecting sections may not be symmetrical structures.

As shown in FIG. 1, outer ends of the first corrugated pipe connecting section 12a are welded to a first adaptor 3a and a second adaptor 3b respectively, wherein the first adaptor 3a is connected to a first connecting pipe 5, and the second adaptor 3b is connected to a second connecting pipe 6. The first corrugated pipe connecting section 12a and the first connecting pipe 5 are preliminarily fixed or limited with respect to the first adaptor 3a, and the second corrugated pipe connecting section 12b and the second connecting pipe 6 are preliminarily fixed or limited with respect to the second adaptor 3b. Specifically, the above components may be assembled in transition fits (design parameters may be selected as follows: allowable deviations of a fitting shaft are +0.03/0; and allowable deviations of a fitting hole are +0.04/0). After the assembling is finished, the components may be welded by furnace welding in a tunnel furnace, which will be specifically described hereinafter. In addition, the components may also be assembled by means of fixing or limiting by tooling, and an assembly is welded by furnace welding in a tunnel furnace. The adaptor, the corrugated pipe and the connecting pipe may also be fixed or limited with respect to one another by means of dotting or providing a protrusion at one of the components, and then the assembly is welded by furnace welding in a tunnel furnace. Compared with flame brazing, by employing the furnace welding in the tunnel, consistency of the vibration absorbing pipe may be relatively better, and the adaptor, the corrugated pipe and the connecting pipe are welded at the same time, which has less effect on the material than welding separately.

Figure 8:
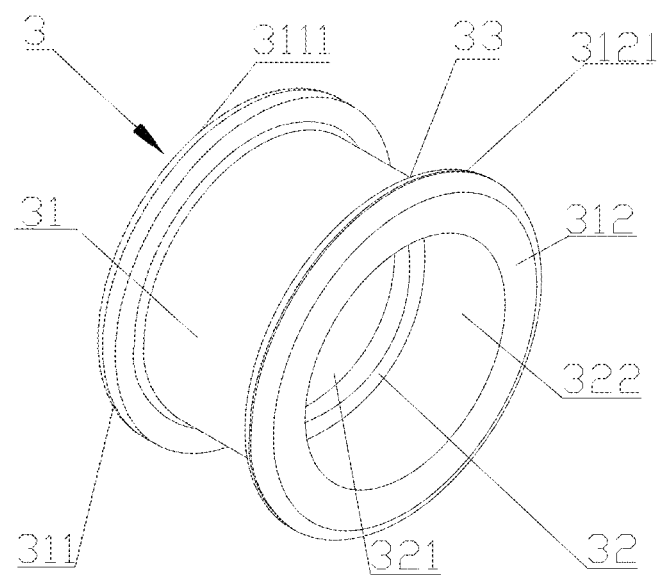
FIG. 8 is a schematic view showing an adaptor in FIG. 1.
Figure 9:
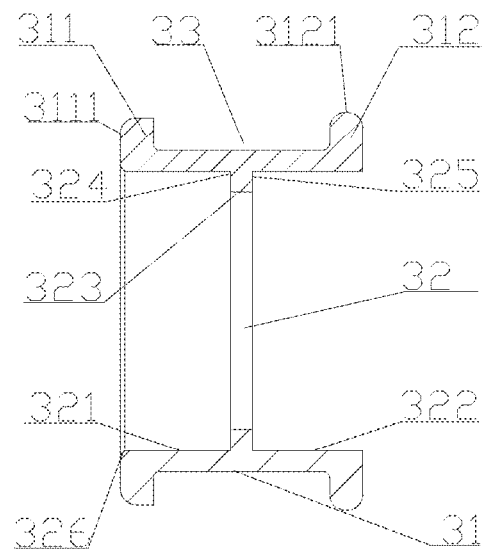
FIG. 9 is a schematic axial sectional view of the adaptor in FIG. 8.

The structure of the adaptor 3 is shown in FIGS. 8 to 9. The adaptor 3 has an adaptor inner cavity 32. The adaptor inner cavity 32 is in communication with an inner cavity of the corrugated pipe 1, and the adaptor is provided with a solder portion in the adaptor inner cavity 32 for placing the solder (not shown in the Figures). The first corrugated pipe connecting section 12*a* and a joint section of the first connecting pipe 5 are inserted at two ends of the inner cavity of the first adaptor 3*a*, respectively. Herein, a portion of the adaptor fitting with the corrugated pipe connecting section is defined as a first adaptor fitting portion, and a portion of the connecting pipe fitting with the adaptor is defined as a second adaptor fitting portion. The joint section of the first connecting pipe 5 is at least partially inserted into the first adaptor fitting portion and the second adaptor fitting portion. The first corrugated pipe connecting section 12*a* and the first connecting pipe 5 may be provided with guiding sections, that is, parts of the first corrugated pipe connecting section 12*a* and the first connecting pipe 5 may be of necking structures. The second corrugated pipe connecting section 12*b* and a joint section of the second connecting pipe 6 are inserted into adaptor fitting portions at two ends of an inner cavity of the second adaptor 3*b* respectively, and the components may be in a transition fit with each other, so that the components may not be separated when being placed in the tunnel furnace, and no additional tooling is required for fixing. In addition, a gap portion is provided at an inner cavity wall portion where the corrugated pipe connecting section and the adaptor fit with each other, and a gap portion is also provided at an inner cavity wall portion where the joint section of the connecting pipe and the adaptor fit with each other. In this way, during welding, the solder placed in the inner cavity of the adaptor can correspondingly flow into the gap portion between the corrugated pipe connecting section and the adaptor, and the gap between the joint section of the connecting pipe and the adaptor after being melted, such that the components are welded.

Figure 3:
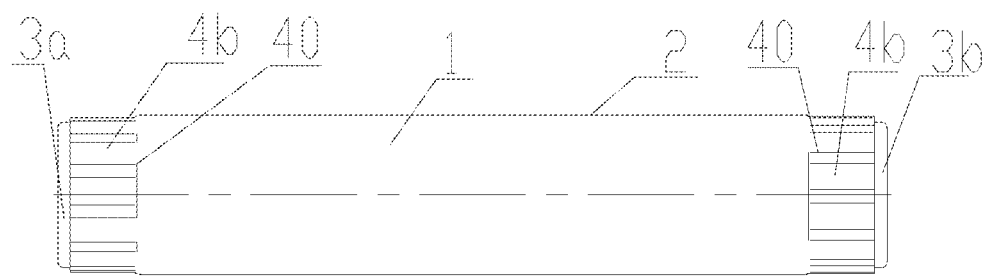
FIG. 3 is a schematic view showing the vibration absorbing pipe in FIG. 1 after a first connecting pipe and a second connecting pipe are removed.

As shown in FIG. 1, the corrugated pipe 1 may also be provided with a braided mesh hose 2, to further protect the corrugated pipe 1 in the vibration absorbing pipe. The braided mesh hose 2 can protect an outside of the corrugated pipe 1, in a case that there is an external damage, the corrugated pipe 1 will not be directly affected. The braided mesh hose 2 may optionally be a stainless steel braided mesh sleeve, which has good strength and toughness. After the components are welded, the braided mesh hose 2 is sleeved on the corrugated pipe body section 11 in a coating manner. Two ends of the braided mesh hose 2 are screwed into the first pressing ring 4*a* and the second pressing ring 4*b* respectively, and the pressing rings are deformed by squeezing the blanks of the pressing rings, thereby fixing the braided mesh hose 2 to the pressure rings and the adaptors. In this way, the pressure rings are not required to be welded to the adaptors or the corrugated pipe, which means welding processes of the first pressing ring 4*a* and the second pressing ring 4*b* are omitted. It should be noted that, lateral indentations 40 of the pressing rings in FIG. 3 are only shown schematically, and the indentations can be eliminated by polishing and shaping, which will not be described in detail.

Figure 2:
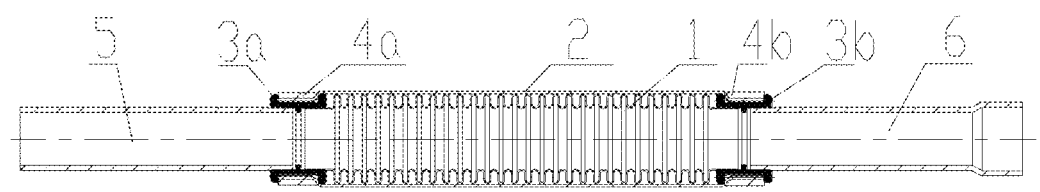
FIG. 2 is a schematic axial sectional view of the vibration absorbing pipe in FIG. 1.

As shown in FIGS. 1 and 2, the present embodiment optimizes the welding structure of the vibration absorbing pipe. The vibration absorbing pipe includes a corrugated pipe 1, two adaptors 3*a* and 3*b* and two connecting pipes 5 and 6. The first connecting pipe 5 may be a common connecting pipe such as a copper pipe configured for connecting with a system, which is favorable for connecting the vibration absorbing pipe to the system in a case that a main body of the system (such as system pipelines, pipeline joints, etc.) is made of copper. The second connecting pipe 6 may be a connecting pipe having a flared portion. The connecting pipes are provided with a first connecting pipe joint section 52 and a second connecting pipe joint section 62 respectively, which are shown in FIGS. 10 to 15. The solder can be placed at specific positions of the adaptor inner cavities 32 of the two adaptors 3*a* and 3*b*. The first corrugated pipe connecting section 12*a* at one end of the corrugated pipe 1 fits with the adaptor fitting portion at an inner side of the first adaptor 3*a*, and the first connecting pipe joint section 52 fits with the adaptor fitting portion at an outer side of the first adaptor 3*a*. Similarly, the second corrugated pipe connecting section 12*b* at the other end of the corrugated pipe 1 fits with the adaptor fitting portion inserted in an inner side of the second adaptor 3*b*, and the second connecting pipe joint section 62 fits with the adaptor fitting portion at an outer side of the second adaptor 3*b*. With such arrangement, the corrugated pipe 1 are fixed to the two connecting pipes 5 and 6 through the first adaptor 3*a* and the second adaptor 3*b* respectively by welding in the tunnel furnace.

A basic manufacturing process of the vibration absorbing pipe includes following steps: placing the solder in the inner cavities of the adaptors 3*a* and 3*b* respectively; fitting the corrugated pipe connecting sections 12*a*, 12*b* of the corrugated pipe 1 and the joint sections of the connecting pipes 5, 6 with the corresponding adaptor fitting portions in the above manner; and, after the components are assembled into an integral body, performing furnace brazing on the assembled assembly in a tunnel furnace. Besides, the components may all be placed on tooling (not shown) and then be welded in a tunnel furnace or other integral welding equipment such as a vacuum welding chamber or a gas shielded welding chamber. During the welding process, the solder, after being melted, flows into gaps between the first corrugated pipe connecting section 12*a* and the inner cavity of the first adaptor 3*a* and between the first connecting pipe joint section 52 and the inner cavity of the first adaptor 3*a*, and gaps between the second corrugated pipe connecting section 12*b* and the inner cavity of the second adaptor 3*b* and between the second connecting pipe joint section 62 and the inner cavity of the second adaptor 3*b*, thereby realizing the welding among the corrugated pipe 1, the corresponding two adaptors 3*a*, 3*b* and the corresponding two connecting pipes 5, 6.

It should be noted that, in order to ensure that the solder flows into the gaps among the corrugated pipe connecting sections 12*a*, 12*b*, the two connecting pipe joint sections 52, 62 and the inner cavities of the corresponding adaptors 3*a*, 3*b*, parameters of the gaps should be reasonably designed. If the gaps are too small, the solder cannot infiltrate into the gaps effectively; while if the gaps are too large, the solder may exude out of end faces of the adaptor fitting portions, which causes weld seams to be exposed, and thereby affecting welding quality. In the present embodiment, a fitting clearance between the corrugated pipe connecting section and the adaptor, and a fitting clearance between the corrugated pipe connecting section and the adaptor are respectively as follows: a length of the fitting clearance between the corrugated pipe connecting section and the adaptor is greater than twice a wall thickness of the corrugated pipe connecting section, and a length of the fitting clearance between the connecting pipe joint section and the adaptor is greater than twice a wall thickness of the connecting pipe joint section. In a specific embodiment, each of the fitting clearances ranges from 0.025 mm to 0.15 mm, and a length of the fitting clearance ranges from 5 mm to 15 mm, in this way, the welding may be relatively reliable and expected infiltration of the solder can be ensured.

The characteristics of the welding method are as follows: the weld seams are located between outer walls of the corrugated pipe connecting sections 12a, 12b and the corresponding adaptor fitting portions of the inner cavities of the adaptors 3a, 3b, and between outer walls of the joint sections of the connecting pipes 5, 6 and the corresponding adaptor fitting portions of the inner cavities of the adaptors 3a, 3b, that is, the weld seams are located inside the adaptors. Exposed areas of the weld seams are relatively small, and the weld seams are located inside the vibration absorbing pipe. In practical use, a fluid medium may be inside the vibration absorbing pipe (for example, a refrigerant flows inside the vibration absorbing pipe in a case that the vibration absorbing pipe is used in a refrigeration system), so the weld seams will not be exposed in the air, thereby reducing corrosion caused by a potential difference when the weld seams are in contact with the air. In addition, the entire vibration absorbing pipe can be completed through only one time of welding, compared with flame brazing, the welding method avoids multiple times of welding of the corrugated pipe, the connecting pipes and the corresponding adaptors, and thereby the consistency of the weld seams are better. Due to the above two factors, the welding quality of the vibration absorbing pipe is effectively improved, and the connection among the components of the product is more reliable. In addition, integral welding also simplifies the welding process and improves the efficiency.

Figure 4:
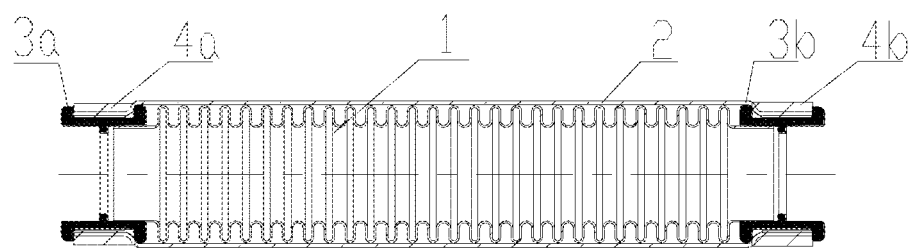
FIG. 4 is a schematic axial sectional view of the vibration absorbing pipe in FIG. 3.

A simplified type of vibration absorbing pipe assembly is shown in FIGS. 3 and 4. As described above, in the embodiment shown in FIGS. 1 and 2, one corrugated pipe 1, two adaptors 3a, 3b and two connecting pipes 5, 6 are integrally welded, to obtain an integral vibration absorbing pipe assembly. It could be understood that, in a practical manufacturing process, only the above one corrugated pipe 1 and two adaptors 3a, 3b may be integrally welded as required, and at least a simplified assembly can be manufactured through such a step, which is specifically shown in FIGS. 3 and 4. After the simplified vibration absorbing pipe assembly is obtained, the simplified vibration absorbing pipe assembly may be further welded to a compressor, circulation pipes of a refrigeration system or corresponding pipe components in other situations where vibration adsorption is required to achieve a corresponding vibration adsorption effect, which will not be described herein. In addition, the embodiment of the present application may also be embodied in such a way in which one side of the corrugated pipe is welded to an adaptor and a connecting pipe and the other side is fixed to a corresponding adaptor by welding.

As shown in FIGS. 5 to 7, the corrugated pipe 1 is preferably made of stainless steel, the corrugated pipe 1 includes the corrugated pipe body section 11 and the corrugated pipe connecting sections 12, wherein the corrugated pipe body section 11 is provided with more than two expansion joints, which can compensate expansion/contraction deformation of the pipe components due to temperature changes and the like. Parameters such as an inner diameter D1 of the corrugated pipe, an outer diameter D2 of the corrugated pipe, a corrugation thickness t, a corrugation pitch q and the like are required to be determined according to components of an external system. In this embodiment, the corrugated pipe 1 may be selected in a following manner: in a case that a pipe diameter of the external system is ½ inch, corrugations of the corrugated pipe may be U-shaped or Ω-shaped, a total length of the corrugated pipe is 225 mm, the pipe diameter of the corrugated pipe is 12 A, a length of the corrugated pipe is 151 mm, a wall thickness of the corrugated pipe is 0.2±0.01 mm, the inner diameter D1 of the corrugated pipe is 12±0.2 mm, the outer diameter D2 of the corrugated pipe is 18±0.2 mm, a corrugation height is 3.0 mm, the corrugation thickness t is 2.0±0.15 mm, and the corrugation pitch q is 3.0±0.15 mm, thus obtaining satisfactory vibration adsorption and noise elimination effects. Of course, other parameters may also be set according to performance indexes of the overall external system. Here, the corrugated pipe connecting sections 12a and 12b are located at the two ends of the corrugated pipe body section 11, respectively. After the adaptors 3a and 3b are mounted to the corrugated pipe connecting sections 12a and 12b respectively, the corrugated pipe connecting sections may be welded to the first connecting pipe 5 and the second connecting pipe 6, or may be directly welded to other external components in the refrigeration system.

It can be understood that, the corrugated pipe 1 may be stretched or contracted to a certain degree when being used, and the corrugated pipe 1 may be damaged in a case that it is excessively stretched or contracted. The corrugated pipe 1 may also be provided with a braided mesh hose 2, the braided mesh hose 2 may specifically be a stainless steel braided mesh, which has good strength and toughness, thereby a purpose of protecting the corrugated pipe 1 can be achieved. Of course, the braided mesh hose may also be a protection mesh in other forms, for example, an aluminum alloy protection mesh or the like. As shown in FIGS. 1 to 4, the braided mesh hose 2 is sleeved on the corrugated pipe body section 11, and the ends of the braided mesh hose are fixed to the adaptors 3a and 3b, to prevent the corrugated pipe 1 of the vibration absorbing pipe from being stretched beyond a certain range. Specifically, outer walls of the adaptors 3a and 3b are each provided with an adaptor outer wall groove 33 (as shown in FIGS. 8 and 9). The braided mesh hose 2 may be pressed against adaptor outer wall grooves 33 by mounting the pressing rings 4a and 4b. This method for assembling the braided mesh hose 2 is relatively simple in operation and has good structural reliability. Since the braided mesh hose and the adaptors are fixed by crimping the pressing rings 4a and 4b, rather than by welding, which means no welding is required, thereby avoiding the problem that defects of the weld seams may occur due to repeated welding at original welded portions.

As shown in FIGS. 8 to 9, the adaptors 3 is specially designed for the vibration absorbing pipe of the present application. Each of the adaptors 3 includes an adaptor body 31 for connecting the corrugated pipe 1 and the first connecting pipe 5 or the corrugated pipe 1 and the second connecting pipe 6. The adaptor body 31 may be made of stainless steel or red copper. Technically, the adaptor body 31 may be formed by lathing a blank or by molding. The adaptor body 31 has an adaptor inner cavity 32, the adaptor inner cavity 32 is in communication with the inner cavity of the corrugated pipe 1 and an inner cavity of the corresponding connecting pipe 5 or 6, and the two ends of the adaptor inner cavity 32 are provided with a first adaptor fitting portion 321 and a second adaptor fitting portion 322 respectively, into which the corrugated pipe 1 and the first connecting pipe 5, or the corrugated pipe 1 and the second connecting pipe 6 are correspondingly mounted for welding. Preferably, a length of welding cooperation between each of the corrugated pipe connecting sections and the corresponding adaptor fitting portion is greater than ⅓ of an outer diameter of the corrugated pipe connecting section, and a length of welding cooperation between each of the connecting pipe joint sections and the corresponding adaptor fitting portion is greater than ⅓ of an outer diameter of the connecting pipe joint section. In this way, absolute lengths of the weld seams or cover areas of the weld seams are increased relatively, which is beneficial to improve welding strength. Of course, the lengths of cooperation of these pipe components may be adjusted within a corresponding range, which will not be described again.

When the adaptor 3 is welded to the corrugated pipe 1 and the first connecting pipe 5 or the corrugated pipe 1 and the second connecting pipe 6, the above arrangement is favorable for improving the welding quality, because the reason of which is as follows. When the corrugated pipe 1 and the corresponding first connecting pipe 5 or the corrugated pipe 1 and the second connecting pipe 6 are mounted into the corresponding first adaptor fitting portion 321 and the second adaptor fitting portion 322 for welding, the weld seams are located between the outer wall of the corresponding corrugated pipe connecting section 12, the outer wall of the joint section of the first connecting pipe 5 or the second connecting pipe 6, and the adaptor fitting portions at two sides of the adaptor inner cavity 32, and the solder can hardly overflow from end faces of the adaptor inner cavities 32, thereby avoiding exposure of the weld seams or reducing exposed areas of the weld seams. Besides, since the weld seams are located inside the pipe, an influence of a potential difference corrosion problem is avoided or reduced, and thereby connection reliability of the pipe components is improved.

The corrugated pipe connecting section 12, and the first connecting pipe 5 or the second connecting pipe 6 may be in clearance fits with the corresponding adaptor fitting portion of the adaptor inner cavity 32, a transition fit may also be adopted, and then manners of furnace welding and the like may be employed for welding. The welding is specifically described as follows: first, placing the solder in a solder placement portion in the inner cavity of the adaptor 3; then assembling the connecting pipe, the corrugated pipe 1 and the inner cavity fitting portions of the adaptor 3; and then performing furnace welding on the entire assembly in a welding furnace or a welding chamber, or fixing the entire assembly to tooling, and then performing furnace welding in the welding furnace or the welding chamber. After being melted, the solder flows, under a capillary action, into a space between joint surfaces between the first adaptor fitting portion 321 and the first connecting pipe 5 or the second connecting pipe 6, and a space between joint surfaces between the second adaptor fitting portion 322 and the corrugated pipe 1, and thus the fixing is realized by welding.

Specifically, positions of solder placement portions of each adaptor 3 are as shown in FIGS. 8 and 9. A middle portion of the adaptor inner cavity 32 is provided with an adaptor inner boss 323, the adaptor inner boss 323 protrudes from an inner wall portion of the adaptor, and a protruding height of the adaptor inner boss 323 may be slightly greater than or equal to a wall thickness of the connecting pipe, or the protruding height of the adaptor inner boss 323 may be slightly greater than or equal to the wall thickness of the corrugated pipe connecting section. Two ends of the adaptor inner boss 323 serve as the placement portions for placing the solder, and the solder may flow, after being melted, into a gap between the joint surfaces between the outer wall of the corrugated pipe connecting section 12 and the adaptor inner cavity 32.

It can be understood that, the arrangement between the first connecting pipe 5 or the second connecting pipe 6 and the adaptor 3 is similar to the above arrangement. Specifically, the adaptor inner cavity 32 is provided with the adaptor inner boss 323 between the adaptor outer side fitting portion 321 and the second adaptor fitting portion 322, and the height of the adaptor inner boss 323 may be identical with the wall thickness of the joint section of the connecting pipe and the wall thickness of the connecting section of the corrugated pipe 1. The "identical" herein means that a difference between the two does not exceed 10%. In this way, an equivalent inner diameter of the connecting pipe, an equivalent inner diameter of the adaptor inner boss, and the equivalent inner diameter of the corrugated pipe differ from one another by no more than 10%, so that a passing diameter of the entire vibration absorbing pipe is not changed, which prevents adverse effects on fluid movements. In this case, the two ends of the adaptor inner boss 323 serve as a solder portion 324 and a solder portion 325 respectively, so that the solder (which generally is a solder ring) can be correspondingly placed for welding the joint surfaces of a fitting portion between the first adaptor fitting portion 321 and the first connecting pipe 5 or the second connecting pipe 6, and the joint surfaces of a fitting portion between the second adaptor fitting portion 322 and the corrugated pipe 1, and thus the first connecting pipe 5 or the second connecting pipe 6, and the corrugated pipe 1 form an integral body through the adaptor 3.

As mentioned above, a braided mesh hose 2 may be provided, to prevent damage to the vibration absorbing pipe. In an embodiment, the braided mesh hose 2 is a stainless steel braided mesh sleeve with a braiding angle of 40° to 60° and a coverage rate of 75% to 95%, of which the strength and toughness are ideal. Welding is not adopted in fixing the braided mesh hose 2. Because of this, the adaptor 3 is modified adaptively according to this embodiment. As shown in FIGS. 8 and 9, during manufacturing, the adaptor outer wall groove 33 may be manufactured by lathing an outer wall of the blank of the adaptor body 31, and thus adaptor outer wall flanges 311 and 312 are formed at two sides of the adaptor outer wall groove 33. In other words, one end of the outer wall of the adaptor body 31 is provided with a first adaptor outer wall flange 311, the other end of the outer wall of the adaptor body 31 is provided with a second adaptor outer wall flange 312, and the adaptor outer wall groove 33 is formed between the first adaptor outer wall flange 311 and the second adaptor outer wall flange 312. The adaptor outer wall grooves 33 are configured for mounting the pressing rings 4a and 4b. The braided mesh hose 2 provided for the corrugated pipe 1 may be fixed to the adaptor outer wall grooves 33 by pressing the blanks of the pressing rings 4, and end surfaces of a pressing ring blank 41 are tightly coupled with inner side surfaces of the flange portions at the two sides of the adaptor outer wall groove 33, thereby increasing a pressing friction force for fixing the braided mesh hose 2. With this method of fixing by the braided mesh hose, welding is not required or welding spots are reduced, thereby reducing connection defects caused by welding. In addition, one end of the outer wall of the adaptor body 31, that is, the end relatively close to the corrugated pipe, may be provided with the first adaptor outer wall flange 311, while the other end of the outer wall of the adaptor body 31 may be or may not be provided with the second adaptor outer wall flange. Besides, other braided mesh hose fixing members such as mesh clips may also be used to fix the braided mesh hose 2.

As shown in FIGS. 8 and 9, the first adaptor outer wall flange 311 and the second adaptor outer wall flange 312 may respectively be provided with a rounded corner portion. A quarter-circular rounded corner portion 3111 is provided at an outer side of the first adaptor outer wall flange 311, to facilitate mounting the pressure ring 4 from the outer side of the first adaptor outer wall flange 311. A semicircular rounded corner portion 3121 is provided at an outer side of the second adaptor outer wall flange 312, so that the braided mesh hose 2 will not be damaged when covering the outer side of the second adaptor outer wall flange 312; in other words, the rounded corner portions 3121, or smooth transition portions, or smooth transition structures may be provided at an inner side and the outer side of the second adaptor outer wall flange 312, so as to protect the braided mesh hose 2.

As described above, when assembling the vibration absorbing pipe of the present application, the connecting pipe and the corrugated pipe 1 are required to be press-fitted into the fitting portions at the two ends of the adaptor 3 for welding. For the convenience of press fitting, portions for guiding may be provided. As shown in FIGS. 8 and 9, an outer end of the adaptor outer side fitting portion 321 is provided with a guiding surface 326, so that the connecting pipe may be easily press-fitted to the first adaptor fitting portion 321; and similarly, an outer end of the second adaptor fitting portion 322 may also be provided with a corresponding guiding surface to facilitate the press-fitting of the first connecting pipe 5 or the second connecting pipe 6, this guiding surface is not shown in FIGS. 8 and 9, therefore will not be described herein.

In a refrigeration system, the corrugated pipe 1 and the first connecting pipe 5 are press-fitted into the corresponding adaptor fitting portions of the adaptor 3 at one side of the corrugated pipe 1, respectively; and the corrugated pipe 1 and the second connecting pipe 6 are press-fitted into the corresponding adaptor fitting portions of the adaptor 3 at the other side of the corrugated pipe 1, respectively, and then welding is performed. The corrugated pipe 1 fits with the corresponding adaptors 3, the first connecting pipe 5 and the second connecting pipe 6 fit with the fitting portions of the corresponding adaptors 3, respectively. After being melted, the solder may flow to joint surfaces of fitting portions between the corresponding pipe components and the adaptors 3, and thus the welding is realized. In order to facilitate assembly and ensure the welding quality, it is necessary to optimize the structures of the connecting pipe and the corrugated pipe 1.

As shown in FIGS. 1 and 2, the vibration absorbing pipe of the present application is provided with a first connecting pipe 5 and a second connecting pipe 6. It can be understood that, only one connecting pipe may be provided in some cases. The assembly relationship among the first connecting pipe 5, the second connecting pipe 6 and the adaptors 3 will be described hereinafter in conjunction with FIGS. 10 to 15. It can be understood that, the corrugated pipe 1 may have a similar structure or may be assembled in a similar method.

Figure 10:
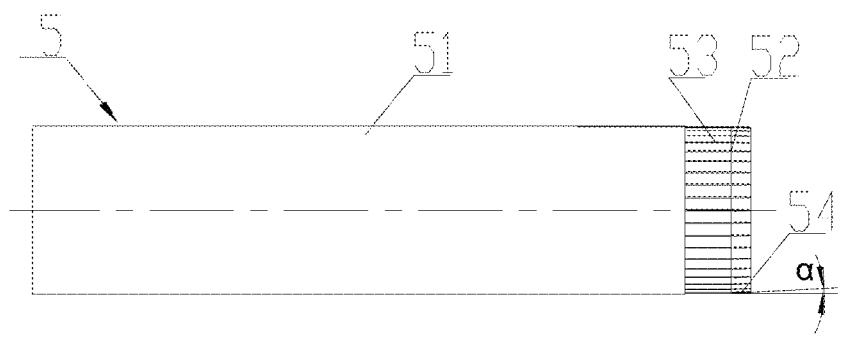
FIG. 10 is a schematic view showing a first connecting pipe in FIG. 1.
Figure 11:
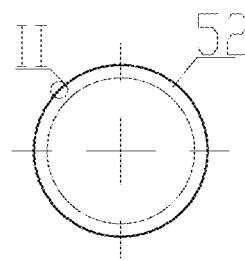
FIG. 11 is a schematic sectional view showing the fitting between the first connecting pipe in FIG. 10 and a second connecting pipe.
Figure 12:
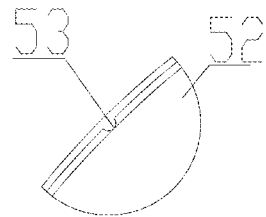
FIG. 12 is an enlarged schematic view showing a portion II in FIG. 11.
Figure 13:
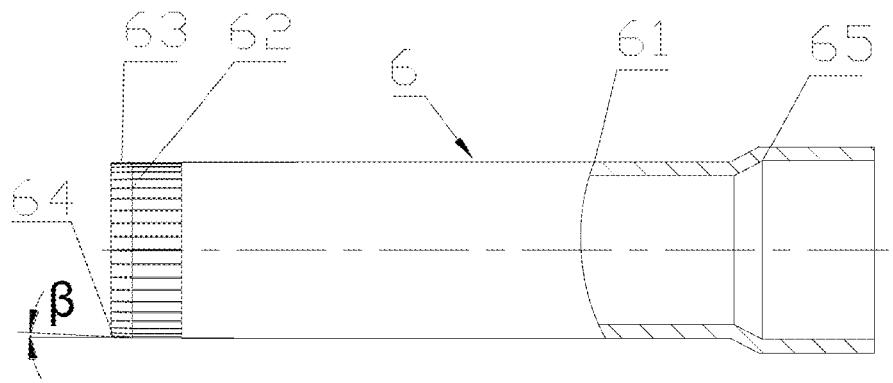
FIG. 13 is a schematic view showing the first connecting pipe in FIG. 11.

As shown in FIGS. 10 to 12, the first connecting pipe 5 may be a copper pipe such as a straight or bent copper pipe, and one end of a connecting pipe body 51 required to be welded is provided with a first connecting pipe joint section 52, an end of the first connecting pipe joint section 52 is provided with a connecting pipe joint section guiding surface 54, wherein a guiding angle $\alpha$ (an angle between a generatrix of the connecting pipe joint section guiding surface 54 and a generatrix of an outer wall of the connecting pipe body 51) is about degrees, which facilitates press-fitting the first connecting pipe 5 into the corresponding fitting portion of the adaptor body 31. In addition, the first connecting pipe 5 shown in FIG. may be required to be provided with a flared portion depending on different connecting components in the external system.

As shown in FIGS. 10 to 12, the first connecting pipe joint section 52 may be in a clearance fit with the fitting portion of the adaptor body 31. In order to improve the fluidity of the melted solder, so as to ensure the welding quality, an outer wall of the first connecting pipe joint section 52 is provided with multiple connecting pipe outer wall grooves 53 extending axially. The connecting pipe outer wall grooves 53 may be formed by wire drawing or thread rolling or extrusion, the number of the connecting pipe outer wall grooves 53 may be 2 to 3.5 times a unit value of a diameter of the connecting pipe (unit: mm), and a specific quantity thereof may be determined according to widths and a size of the connecting pipe. In addition, a width and a depth of each of the outer wall grooves 53 may range from 0.025 mm to 0.15 mm, preferably 0.05 mm to 0.12 mm, and a cross-sectional shape of the outer wall groove may be semicircle-shaped, arc-shaped, trapezoid-shaped, rectangle-shaped, V-shaped, or the like. With these connecting pipe outer wall grooves 53, the solder may have better fluidity, and thus the welding quality is better ensured.

Of course, the connecting pipe outer wall grooves 53 may also be embodied in a form of connecting pipe outer wall ribs (not shown) formed by wire drawing, and a shape, size and arrangement thereof may be similar to those of the connecting pipe outer wall grooves 53. Rib portions and the adaptor are tightly fitted with respect to each other, and the solder can flow between the adjacent rib portions, and thus the solder has better fluidity during welding. In this way, the connecting pipe and the adaptor can be fixed or limited with respect to each other without external tooling, that is, the connecting pipe and the adaptor can be reliably welded without external tooling, which will not be further described. It can be understood that, the outer wall ribs may be replaced by other forms of protruding portions.

Figure 14:
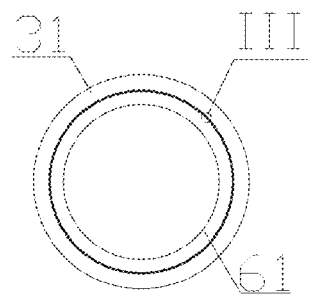
FIG. 14 is a schematic sectional view showing the fitting between the second connecting pipe and the adaptor in FIG. 12.
Figure 15:
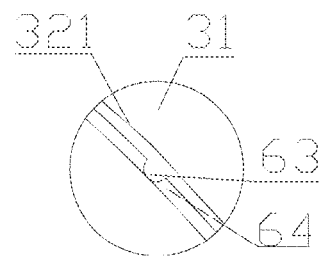
FIG. 15 is an enlarged schematic view showing a portion III in FIG. 13.
Figure 16:
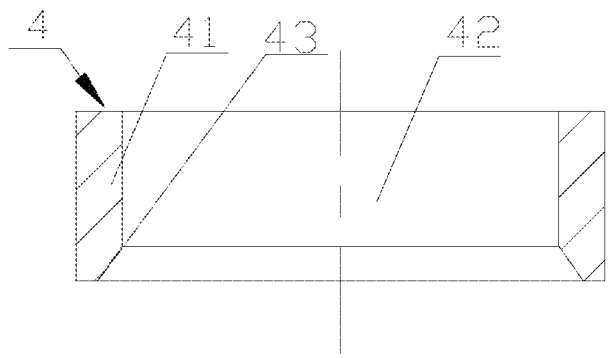
FIG. 16 is a schematic view showing a blank of a pressing ring in FIG. 1.

As shown in FIGS. 14 to 16, another type of second connecting pipe 6 is a straight copper pipe having a flared portion 65. A connecting pipe body 61 is also provided with a second connecting pipe joint section 62, an end of the second connecting pipe joint section 62 is provided with a connecting pipe joint section guiding surface 64, wherein a guiding angle (an angle between a generatrix of the connecting pipe joint section guiding surface 64 and an outer wall of the connecting pipe body 61) is about 10 degrees. In addition, an outer wall of the second connecting pipe joint section 62 is provided with multiple connecting pipe outer wall grooves 63 or connecting pipe outer wall ribs or a combination of grooves or ribs in a radial direction, and the number of the above grooves or ribs may be 2 to 3.5 times a unit value of a diameter of the second connecting pipe 6 (unit: mm), so as to ensure that the solder can flow better between the second connecting pipe 6 and the corresponding first adaptor fitting portion 321. Other parts of the second connecting pipe 6 may refer to the structure of the connecting pipe shown in FIGS. 12 to 14, which will not be described again. In addition, the second connecting pipe 6 shown in FIG. 12 may not be provided with a flared portion, depending on different connecting components.

It should be noted that, the above structure may also be employed in a case that the corrugated pipe 1, the first connecting pipe 5 and the second connecting pipe 6 are square pipes. Correspondingly, the adaptors 3 are also not limited to round pipes. In addition, the first connecting pipe 5 and the second connecting pipe 6 are not limited to straight pipes. In a case that the first connecting pipe 5 and the second connecting pipe 6 are bent pipes (fitting portions are connecting pipes), they may also be connected in the above manner. The vibration absorbing pipe in this case also has high connection reliability, which will not be described herein.

As shown in FIG. 16, the pressing rings 4 may be made of a material (such as red copper or stainless steel) satisfying hardness and ductility requirements. Specifically, the above material is formed into annular pressing ring blanks 41, and a diameter of an inner hole 42 of each of the annular pressing ring blanks 41 is slightly greater than a maximum outer diameter of the flange at the side of the adaptor outer wall groove 33. An assembly method is described as follows. After the corrugated pipe 1, the first adaptors 3a and 3b, and the connecting pipes 5 and 6 are welded, wrapping the corrugated pipe 1 and at least most of the adaptors 3 at the two ends with the braided mesh hose 2, to allow the braided mesh hose 2 to at least wrap the adaptor outer wall grooves 33, then sleeving the pressing ring blanks 41 over the adaptor outer wall grooves 33 of the adaptors 3 and the braided mesh hose at the same time, and then making the pressing ring blanks 41 contract by squeezing. Thus, pressing rings 4 for fixing the braided mesh hose 2 are formed on the adaptors, and thereby a vibration absorbing pipe with the braided mesh hose 2 is obtained. Herein, the braided mesh hose 2 may specifically be a stainless steel braided mesh sleeve with the braiding angle of 40° to 60° and the coverage rate of 75% to 95%.

It is easily understood that, when manufacturing the pressing ring blanks 41, an inner guiding surface 43 may be prearranged at an end of each of the pressing ring blanks 41, so that the pressing ring blank 41 may be smoothly mounted to the adaptor outer wall groove 33 of the adaptor 3. This assembly method of the braided mesh hose 2 omits a welding process, which not only is relatively simple in operation, but also has good structural reliability. Herein, the braided mesh hose 2 is mounted to the adaptor outer wall groove 33. Of course, a structure of other forms may also serve as an accommodating portion for the braided mesh hose. The accommodating portion provides suitable friction forces and squeezing forces for the braided mesh hose 2, and thereby the protection mesh such as the braided mesh hose 2 can be reliably mounted. Similar structures may also be applicable for other types of protection meshes.

According to one of the above specific embodiments, a material of the corrugated pipe 1 and the braided mesh hose may be stainless steel, and a material of the first connecting pipe 5, the second connecting pipe 6, and the adaptors may be copper, so that the vibration absorbing pipe may be used in a situation in which a main material of a system is copper (for example, the material of system pipelines and pipeline joints is copper). The solder between the corrugated pipe 1 and the adaptors 3, and the solder between the first connecting pipe 5 or the second connecting pipe 6 and the adaptor 3 may be a same material such as bronze. For example, a tin-bronze solder is used in a specific embodiment, a melting point of the tin-bronze solder may reach about 1000 degrees Celsius, and generally is above 980 degrees Celsius, which can better satisfy the welding requirements of the stainless steel and copper. In addition, the melting point of the tin-bronze solder is higher than that of an ordinary copper-based solder such as a phosphor-copper solder. Even if the vibration absorbing pipe is required to be fixed to the system by welding, since the melting point of the vibration absorbing pipe itself is higher than that of the cooper-based solder by about 180 degrees Celsius, the subsequent welding may have little effect on the vibration absorbing pipe. In addition, the corrugated pipe may also be made of a copper material. Of course, the corrugated pipe 1, the adaptors 3 and the connecting pipe may adopt different materials. In this case, other suitable solders should be selected. For example, for welding an aluminum alloy with stainless steel or steel, two or more types of solders may be chosen among aluminum, nickel, nickel alloy, titanium, titanium alloy, copper, copper alloy and silver.

In a specific embodiment, the adaptors are made of red copper, and correspondingly the pressing rings 4 are also made of copper, so that the fixing of the pressing rings 4 is relatively reliable. In addition, the vibration absorbing pipe in this specification may also be referred to as a vibration preventing pipe or a vibration avoiding pipe.

In another specific embodiment, the corrugated pipe 1 and the braided mesh hose may be made of stainless steel, and the first connecting pipe 5, the second connecting pipe 6, and the adaptors may be made of aluminum materials. In this way, the vibration absorbing pipe can be used in a situation in which a main material of the system is aluminum (for example, a material of system pipelines and pipeline joints is aluminum).

The vibration absorbing pipe of several specific embodiments have been described above, and typical applicable occasions thereof may be pipelines of products such as an air conditioner, a refrigerator, an automobile air conditioning system and the like. By connecting a compressor and a circulating pipeline of a refrigeration system pipeline through the vibration absorbing pipe, a better vibration adsorption effect can be achieved.

The structure of the vibration absorbing pipe according to the embodiments of the present application has been described above. On this basis, a method for manufacturing the vibration absorbing pipe is described herein.

Figure 17:
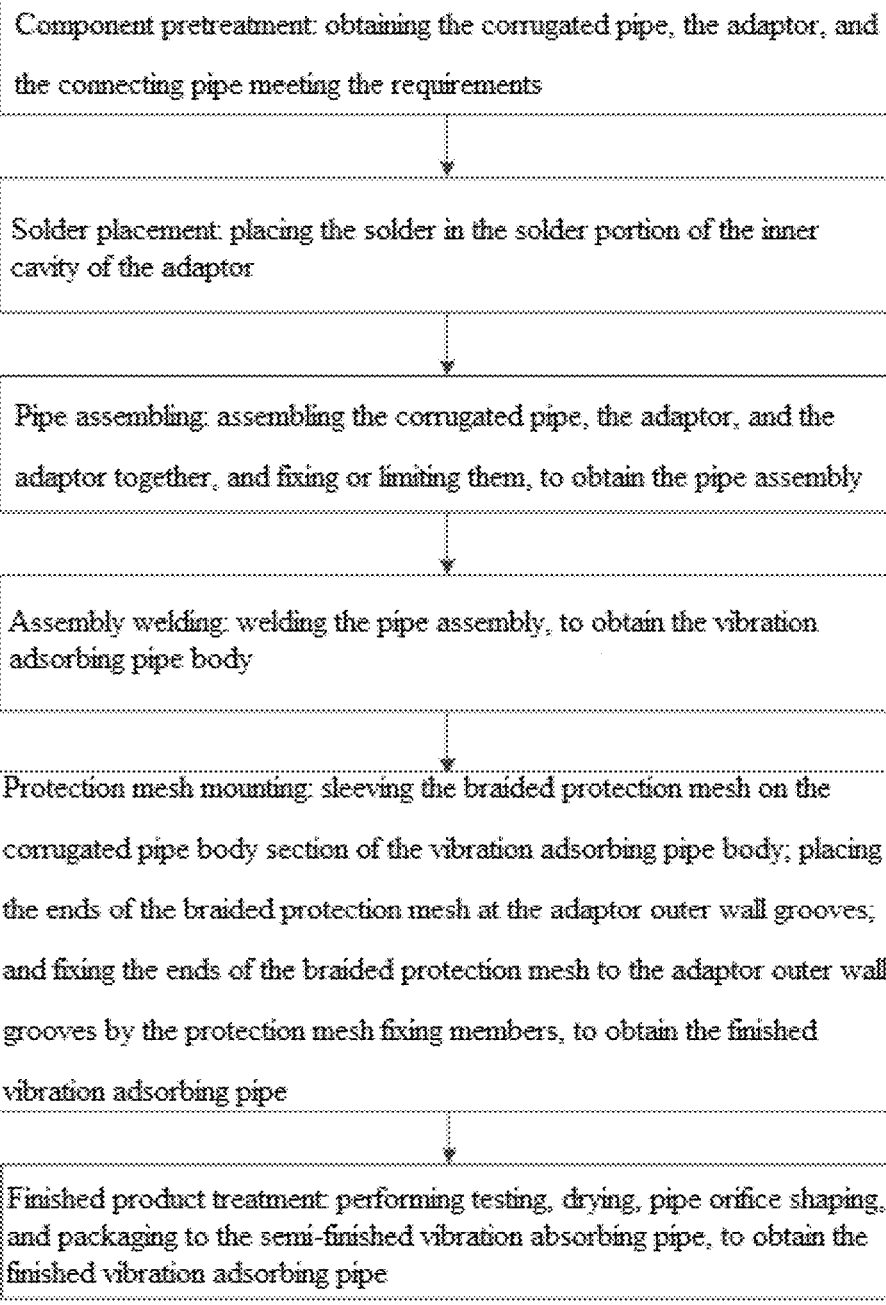
FIG. 17 is a flow chart showing a method for manufacturing a vibration absorbing pipe according to an embodiment of the present application.

Reference is made to FIG. 17, which shows a method for manufacturing a vibration absorbing pipe according to an embodiment of the present application. The method for manufacturing the vibration absorbing pipe includes a component pretreatment process, a solder placement process, a pipe assembling process, a braided mesh hose mounting process, and a finished product treatment process, wherein specific operation steps and functions of the processes are as follows.

1. Component Pretreatment Process

In this process, components meeting the requirements are obtained, such as a corrugated pipe, an adaptor, and a connecting pipe are obtained. These components should meet the following requirements: the corrugated pipe includes a corrugated pipe body located at a middle portion, at least one end of the corrugated pipe body is provided with a corrugated pipe connecting section extending in an axial direction; the adaptor has an adaptor inner cavity, a middle portion of the adaptor inner cavity is provided with a solder portion, two ends of the adaptor inner cavity are each provided with an adaptor fitting portion; in addition, the corrugated pipe further includes other structures in the above-mentioned corrugated pipe, which will not be described again. These components may be self-manufactured or purchased.

Specifically, in a case that the components are purchased, the component pretreatment process may be omitted, and this process is completed by another factory. The process specifically includes treatments of the corrugated pipe, the adaptor and the connecting pipe, which are described in detail as follows.

The corrugated pipe treatment process includes the processes of performing blanking, chamfering, pipe orifice shaping, and ultrasonic cleaning to a corrugated pipe raw material. These processes may be operated by means of conventional processes, and the corrugated pipe meeting the requirements is obtained after these processes are completed.

The adaptor treatment process includes processing a corresponding adaptor inner cavity, an adaptor inner boss, and an adaptor outer wall groove on an adaptor blank, to obtain the adaptor meeting the requirements, and the adaptor can connect the corrugated pipe and the connecting pipe well as an adapting carrier.

The connecting pipe treatment process includes performing blanking, chamfering, wire drawing, and ultrasonic cleaning to a connecting pipe raw material, to obtain the connecting pipe meeting the requirements. Generally, the connecting pipe may be flared or not according to the requirements.

In addition, the component pretreatment process also includes performing blanking and ultrasonic cleaning to a braided mesh hose, and performing blanking and ultrasonic cleaning to pressing ring blanks and so on. After completing these processes, other manufacturing processes of the entire vibration absorbing pipe may be performed, which will be described hereinafter.

2. Solder Placement Process

In this process, a solder is pre-placed in the solder portion of the adaptor inner cavity. Generally, a melting point of the solder is about 800 degrees Celsius. However, in order to make the welding of the vibration absorbing pipe more reliable, a solder having a melting point not lower than 980 degrees Celsius may be used, such as a bronze solder or the like.

3. Pipe Assembling Process

After the above process is completed, that is, after the solder is placed, a pipe assembly may be formed by assembling. The adaptor, the corrugated pipe, and the connecting pipe are assembled to form an integrated pipe assembly for a next welding process. A specific assembly method is described as follows. The assembly method specifically includes: assembling the corrugated pipe, the adaptor, and the connecting pipe, to allow the corrugated pipe to fit with the adaptor through one adaptor fitting portion, and allow the connecting pipe to fit with the adaptor through another adaptor fitting portion, so that inner cavities of the adaptor, the corrugated pipe and the connecting pipe are in communication with one another. In a case that a part of a portion between the corrugated pipe and the adaptor, and a part of a portion between the adaptor and the connecting pipe are in transition fits or interference fits, external tooling is not required for fixing the corrugated pipe, the adaptor and the connecting pipe; and in a case that a part of the portion between the corrugated pipe and the adaptor, and a part of the portion between the adaptor and the connecting pipe are in clearance fits, external tooling may be employed for fixing and limiting the above three components, to obtain the pipe assembly. The specific assembly method may be one of the following methods:

assembling the corrugated pipe, the connecting pipe and the adaptor into an integral body, and fixing or limiting the above three components by means of dotting or providing a protrusion at one of the corrugated pipe, the connecting pipe and the adaptor, to obtain the pipe assembly of the corrugated pipe, the connecting pipe and the adaptor;

assembling the corrugated pipe, the connecting pipe and the adaptor into an integral body, and preliminarily fixing or limiting the above three components by means of transitional fits, to obtain the pipe assembly of the corrugated pipe, the connecting pipe and the adaptor; and press-fitting the corrugated pipe and the connecting pipe respectively to the adaptor by means of transition fits for preliminary fixing or limiting, to obtain the pipe assembly of the corrugated pipe, the connecting pipe and the adaptor. A size of a fitting clearance between the corrugated pipe connecting section and the corresponding adaptor fitting portion is greater than twice a wall thickness of the corrugated pipe connecting section, and a size of a fitting clearance between the connecting pipe joint section and the corresponding adaptor fitting portion is greater than twice a wall thickness of the connecting pipe joint section.

Then, the assembly may be placed in an integrated welding apparatus for welding.

4. Assembly Welding Process

In the process, the pipe assembly is welded to obtain a vibration absorbing pipe body. Specifically, the pipe assembly is placed in the welding apparatus for welding. More specifically, for example, the pipe assembly is welded in a tunnel furnace, a vacuum welding chamber, a gas shielded welding chamber or a welding box, and a welding temperature, a welding time and the like may be determined according to parameters of these apparatus, main materials of the pipes to be welded, and the solder, etc.

5. Braided Mesh Hose Mounting Process

A purpose of mounting the braided mesh hose is to prevent the corrugated pipe in the vibration absorbing pipe from being damaged, and the specific process includes: sleeving the braided mesh hose over the corrugated pipe body section of the vibration absorbing pipe body; in this embodiment, placing ends of the braided mesh hose at adaptor outer wall grooves; and fixing the ends of the braided mesh hose into the adaptor outer wall grooves by braided mesh hose fixing members, to obtain the vibration absorbing pipe. In this process, a method for fixing the braided mesh hose may be as follows: sleeving the pressing ring blanks on the ends of the braided mesh hose, and squeezing the pressing ring blanks to deform the pressing ring blanks, so as to tightly press the ends of the braided mesh hose into the adaptor outer wall grooves of adaptors. In this way, the braided mesh hose can be fixed without welding, thereby obtaining a finished vibration absorbing pipe having a protecting function. In addition, an adaptor outer wall groove of each of the adaptors may also be replaced by other structures, such as a protrusion arranged at a side of the adaptor close to the corrugated pipe.

6. Finished Product Treatment Process

This process is optional. After the vibration absorbing pipe is obtained, testing, drying, pipe orifice shaping and packaging may further be performed, and then a finished vibration absorbing pipe product is obtained. This finished vibration absorbing pipe is obtained by welding the corrugated pipe, the adaptor and the connecting pipe in a furnace at one time. The product has relatively better consistency, and reliable welding connection. Besides, weld seams are located at an inner side of the vibration absorbing pipe, which is beneficial for the service life of the product.

The embodiments of the present application have been described above in detail. For those skilled in the art, a few of modifications and improvements may be made to the present application without departing from the principle of the present application, and these modifications and improvements are also deemed to fall into the scope of protection of the present application defined by the claims.

The invention claimed is:

1. A vibration absorbing pipe, comprising a corrugated pipe, wherein
the corrugated pipe comprises a corrugated pipe body and two corrugated pipe connecting sections, and two ends of the corrugated pipe body are each provided with one corrugated pipe connecting section;
the vibration absorbing pipe further comprises two adaptors, each adaptor comprises a first adaptor fitting portion that fits with the corresponding corrugated pipe connecting section, and the corrugated pipe is welded to the adaptors through the corrugated pipe connecting sections;
each of the two adaptors has an inner cavity, and the inner cavity of each adaptor is in communication with an inner cavity of the corrugated pipe; and
the respective corrugated pipe connecting section is at least partially located in the corresponding adaptor, the corrugated pipe connecting sections are used for fitting with the adaptors, an outer wall portion of the corresponding corrugated pipe connecting section is fixed to at least a portion of an inner wall portion of the first adaptor fitting portion by welding, and a weld seam between the corrugated pipe and each adaptor is at least partially located at the corresponding corrugated pipe connecting section and/or an inner side of the corresponding adaptor; and wherein
the vibration absorbing pipe further comprises two connecting pipes;
each adaptor comprises an inner boss, and the respective inner boss is located at a middle portion of the inner cavity of the corresponding adaptor; and
the corrugated pipe is fixed to the connecting pipes through the adaptors, the respective connecting pipe is at least partially located in the corresponding adaptor, at least a part of an outer wall portion of the respective connecting pipe is fixed to at least a part of an inner wall portion of a second adaptor fitting portion of the corresponding adaptor by welding, and a weld seam between the respective connecting pipe and the corresponding adaptor is at least partially located at the respective connecting pipe and/or the inner side of the corresponding adaptor,
a portion between the respective corrugated pipe connecting section and the corresponding first adaptor fitting portion is at least partially provided with a fitting clearance, the fitting clearance is arranged to extend axially, the fitting clearance is filled with solder, and a length of the fitting clearance in an axial direction is greater than twice a wall thickness of the corresponding corrugated pipe connecting section; and
a fitting clearance is provided between the respective connecting pipe and the corresponding second adaptor fitting portion, the fitting clearance is arranged to extend axially, and the fitting clearance is filled with solder; the respective connecting pipe comprises a connecting pipe joint section, and a length of the fitting clearance between the connecting pipe joint section and the corresponding second adaptor fitting portion is greater than twice a wall thickness of the corresponding connecting pipe joint section,
the vibration absorbing pipe comprises the two connecting pipes, a material of each connecting pipe is different from a material of the corrugated pipe, the corrugated pipe is made of stainless steel, each connecting pipe is made of copper or aluminum, and each adaptor is made of red copper; and
the vibration absorbing pipe comprises a protection mesh, the protection mesh is made of stainless steel, each corrugated pipe connecting section is welded to the corresponding adaptor, and the respective adaptor is welded to the corresponding connecting pipe; the protection mesh is a stainless steel braided mesh sleeve, a braiding angle of the stainless steel braided mesh sleeve ranges from 40° to 60°, and a coverage rate of the stainless steel braided mesh sleeve ranges from 75% to 95%.

2. The vibration absorbing pipe according to claim 1, wherein
an outer wall of the connecting pipe joint section is provided with a plurality of connecting pipe outer wall grooves or connecting pipe outer wall protrusions extending axially, a number of the connecting pipe outer wall grooves or connecting pipe outer wall protrusions is 2 to 3.5 times a numerical value of a diameter of the connecting pipe, and a depth of each of the connecting pipe outer wall grooves or a height of each of the connecting pipe outer wall protrusions ranges from 0.05 mm to 0.12 mm.

3. The vibration absorbing pipe according to claim 2, wherein the connecting pipe outer wall protrusions are connecting pipe outer wall ribs, the connecting pipe outer wall ribs and/or the connecting pipe outer wall grooves are formed by wire drawing or thread rolling or extrusion, and a cross-section of each of the connecting pipe outer wall ribs and/or each of the connecting pipe outer wall grooves is semicircle-shaped, arc-shaped, trapezoid-shaped, rectangle-shaped, or V-shaped.

4. The vibration absorbing pipe according to claim 1, wherein
the vibration absorbing pipe comprises two protection mesh fixing members, a middle body of the protection mesh is sleeved on the corrugated pipe body, each of two ends of the protection mesh is fixed to the corresponding one of the adaptors by the corresponding one of the protection mesh fixing members, and the protection mesh fixing members are configured to fix the two ends of the protection mesh to the adaptors by pressing or clamping,
an outer wall of each of the adaptors is provided with an adaptor outer wall groove, the protection mesh fixing members are configured to fix the two ends of the protection mesh to adaptor outer wall grooves, the adaptor is provided with a flange portion at a side relatively close to the corrugated pipe body, an outer side of the flange portion being in contact with the protection mesh is a transition structure, at least a part of each of the protection mesh fixing members is smaller than the flange portion, and at least a part of the protection mesh fixing member is located in the adaptor outer wall groove; or
an outer wall of each of the adaptors is provided with an accommodating portion, the protection mesh fixing members are configured to fix the two ends of the protection mesh to accommodating portions, the adaptor is provided with a flange portion at a side relatively close to the corrugated pipe body, the accommodating portion is located at a side of the flange portion relatively away from the corrugated pipe body, an outer side of the flange portion being in contact with the protection mesh is a transition structure, at least a part of each of the protection mesh fixing members is smaller than the flange portion, and at least a part of the protection mesh fixing member is located in the accommodating portion.

5. The vibration absorbing pipe according to claim 4, wherein the protection mesh fixing members are pressing rings, the pressing rings have deformable pressing ring blanks, the pressing ring blanks are configured to press and fix the two ends of the protection mesh into the accommodating portions by squeezing, and the protection mesh, and the protection mesh fixing members are not welded.

6. The vibration absorbing pipe according to claim 1, wherein a transition fit is formed between the respective corrugated pipe connecting section and the corresponding first adaptor fitting portion, and the first adaptor fitting portion and the second adaptor fitting portion at two sides of the inner cavity of the respective adaptor are each provided with a guiding portion, to play a guiding role when the respective corrugated pipe connecting section and the corresponding connecting pipe joint section are inserted into the first adaptor fitting portion and the second adaptor fitting portion respectively.

7. The vibration absorbing pipe according to claim 1, wherein each connecting pipe is located at a second side of the corresponding adaptor inner boss, and a weld seam between the respective connecting pipe and the corresponding adaptor is located at the second side of the corresponding adaptor inner boss; or the respective corrugated pipe connecting section is located at a first side of the corresponding adaptor inner boss, solder portions configured for accommodating solder are arranged at two ends of the corresponding adaptor inner boss, the solder is configured to flow into fitting clearances axially extending between the respective corrugated pipe connecting section and the corresponding first adaptor fitting portion, and between the respective connecting pipe joint section and the corresponding second adaptor fitting portion during welding, and each of the fitting clearances ranges from 0.025 mm to 0.15 mm, and the length of the fitting clearance ranges from 5 mm to 15 mm.

8. The vibration absorbing pipe according to claim 1, wherein the vibration absorbing pipe comprises two protection mesh fixing members, a middle body of the protection mesh is sleeved on the corrugated pipe body, each of two ends of the protection mesh is fixed to the corresponding one of the adaptors by the corresponding one of the protection mesh fixing members, and the protection mesh fixing members are configured to fix the two ends of the protection mesh to the adaptors by pressing or clamping.

* * * * *